United States Patent
Hosaka et al.

(10) Patent No.: US 7,539,174 B2
(45) Date of Patent: May 26, 2009

(54) MOBILE COMMUNICATION SYSTEM, MOBILE STATION DEVICE, AND NETWORK-SIDE DEVICE

(75) Inventors: Koji Hosaka, Yokohama (JP); Yasuhiro Kato, Yokohama (JP); Yoshifumi Morihiro, Yokohama (JP); Kiyotatsu Suto, Yokohama (JP); Masashi Watanabe, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 475 days.

(21) Appl. No.: 11/073,640

(22) Filed: Mar. 8, 2005

(65) Prior Publication Data

US 2005/0201354 A1    Sep. 15, 2005

(30) Foreign Application Priority Data

Mar. 9, 2004    (JP)    .............................. 2004-066358

(51) Int. Cl.
*H04J 3/24*    (2006.01)
*H04L 1/00*    (2006.01)

(52) U.S. Cl. ...................................... 370/349; 370/236
(58) Field of Classification Search ................. 714/748, 714/749; 370/236, 229, 241, 253, 242, 338
See application file for complete search history.

(56) References Cited

U.S. PATENT DOCUMENTS

| | | | |
|---|---|---|---|
| 6,269,080 B1 * | 7/2001 | Kumar ........................ | 370/236 |
| 6,487,689 B1 * | 11/2002 | Chuah ......................... | 714/748 |
| 6,697,983 B1 * | 2/2004 | Chintada et al. ............ | 714/748 |
| 7,298,701 B2 * | 11/2007 | Hsu et al. .................... | 370/235 |
| 2002/0024932 A1 * | 2/2002 | Iizuka .......................... | 370/232 |
| 2004/0148396 A1 * | 7/2004 | Meyer et al. ................. | 709/227 |
| 2005/0020322 A1 * | 1/2005 | Ruuska et al. ............... | 455/574 |

(Continued)

FOREIGN PATENT DOCUMENTS

JP    7-264658    10/1995

(Continued)

OTHER PUBLICATIONS

"3rd Generation Partnership Project; Technical Specification Group Radio Access Network; Radio Link Control (RLC) protocol specification (Release 1999)", 3GPP TS 25.322, V3.14.0, Mar. 2003, pp. 1-74.

*Primary Examiner*—George Eng
*Assistant Examiner*—Michael Faragalla
(74) *Attorney, Agent, or Firm*—Oblon, Spivak, McClelland, Maier & Neustadt, P.C.

(57) ABSTRACT

The present invention relates to a mobile communication system in which data is transmitted and received through a wireless transmission line between a mobile station device and a network-side device. A receiving-side device includes a retransmission request transmitter configured to transmit, to a transmitting-side device, a retransmission request for requesting retransmission processing on each data unit of the data, when a reception error is detected in the data unit. The transmitting-side device includes a retransmission time storage configured to store a retransmission time at which the retransmission processing is performed on the data unit; and a retransmission controller configured to control so as not to perform the retransmission processing on the data unit related to a received retransmission request, when the retransmission time of the data unit is stored and a difference between the retransmission time and a current time is shorter than a retransmission prohibition period.

4 Claims, 13 Drawing Sheets

U.S. PATENT DOCUMENTS

2005/0176473 A1 * 8/2005 Melpignano ................ 455/574

FOREIGN PATENT DOCUMENTS

| JP | 8-213973 | 8/1996 |
|---|---|---|
| JP | 9-181772 | 7/1997 |
| JP | 10-190635 | 7/1998 |
| JP | 11-177536 | 7/1999 |
| JP | 2000-83013 | 3/2000 |
| JP | 2003-143219 | 5/2003 |
| JP | 2003-169040 | 6/2003 |

* cited by examiner

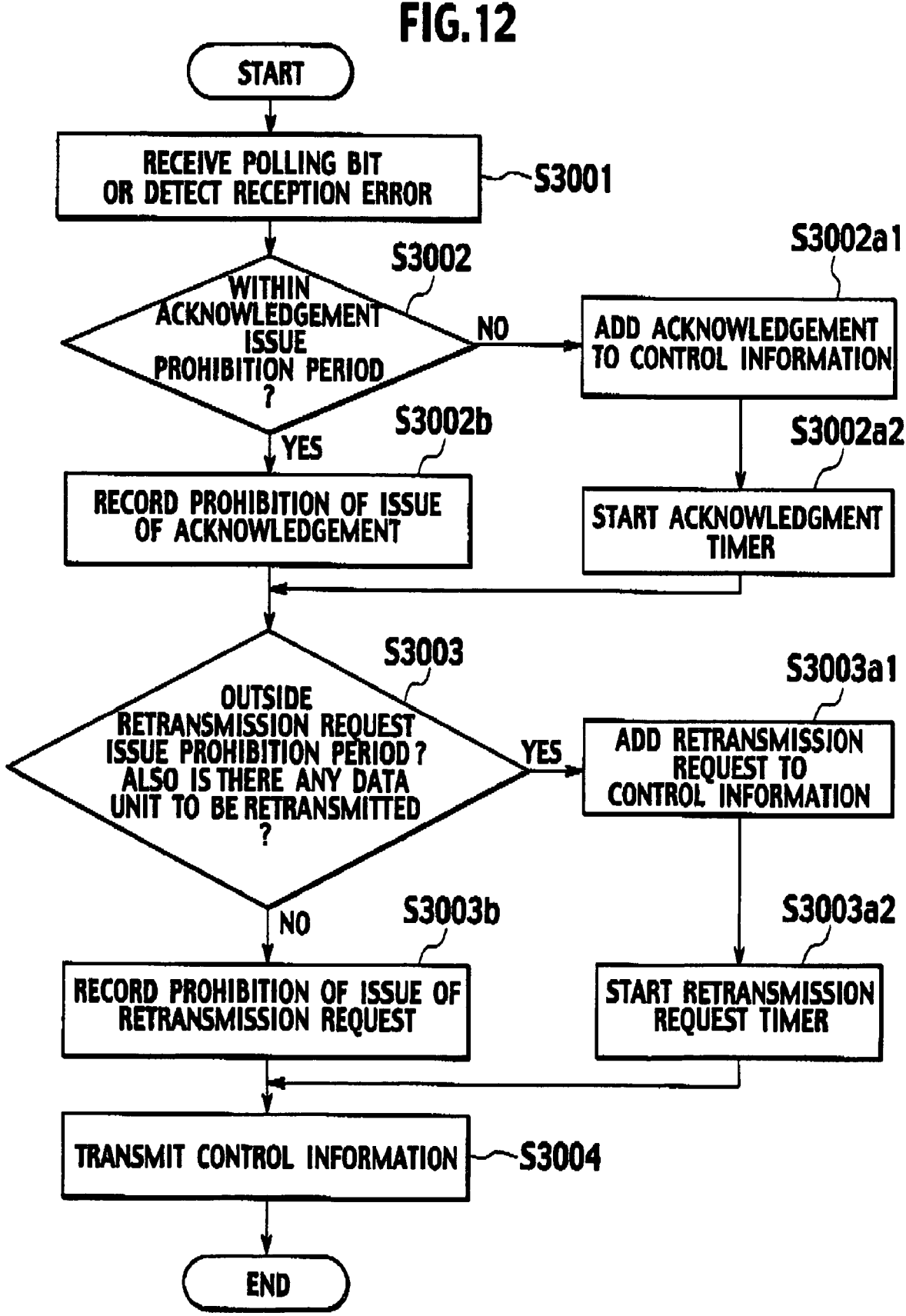

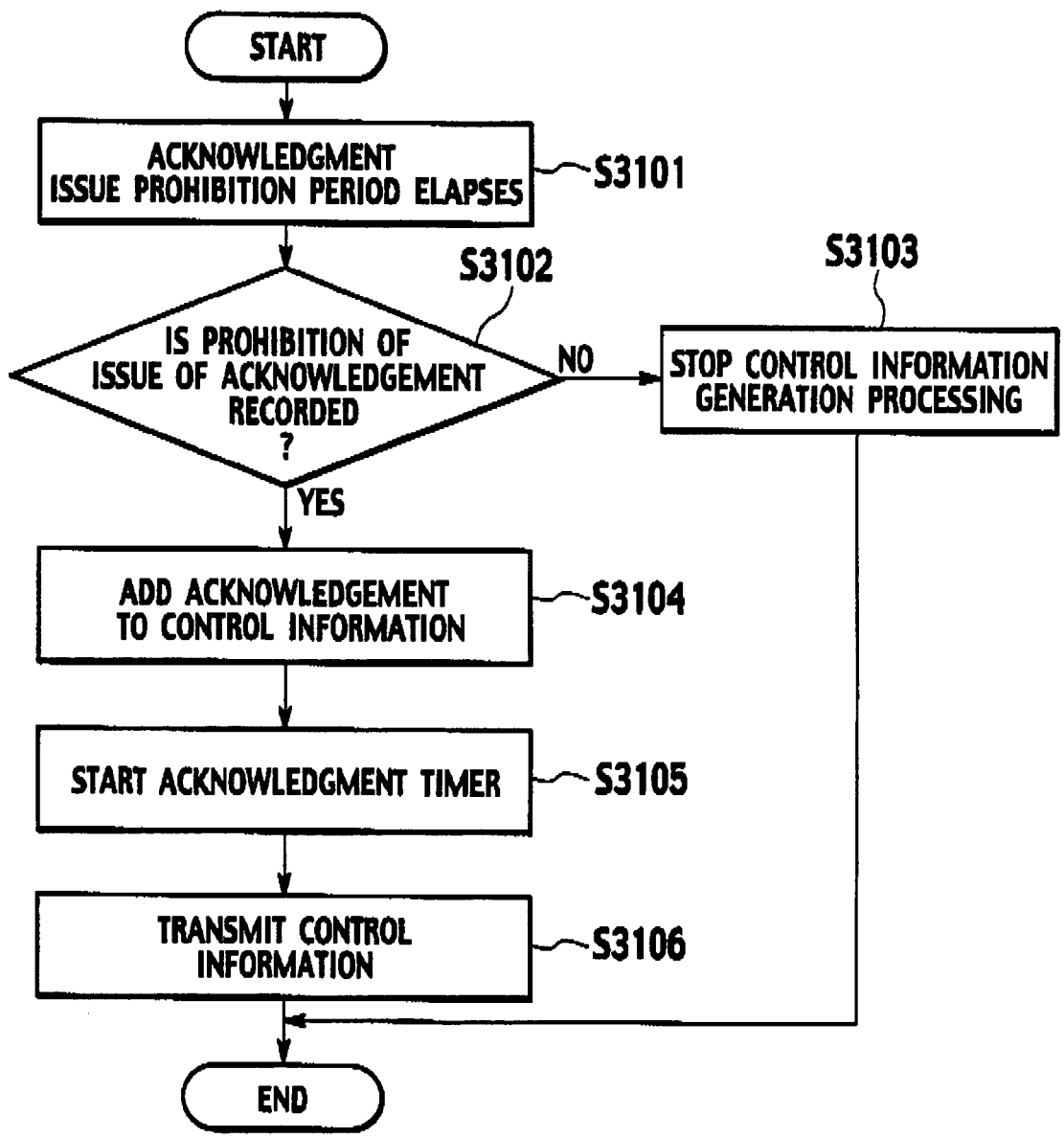

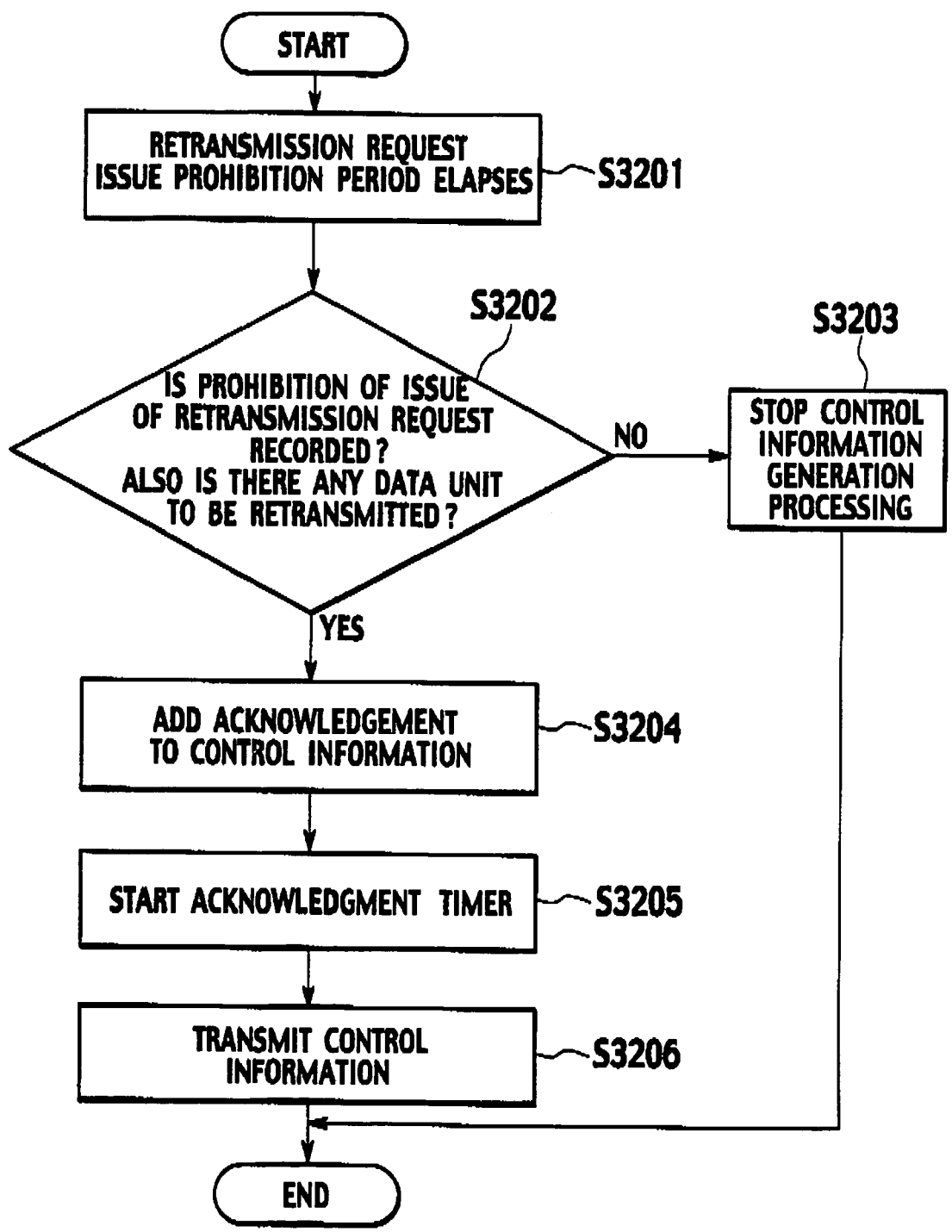

MOBILE COMMUNICATION SYSTEM, MOBILE STATION DEVICE, AND NETWORK-SIDE DEVICE

CROSS-REFERENCE TO RELATED APPLICATION

This application is based upon and claims the benefit of priority from the prior Japanese Patent Application No. P2004-066358, filed on Mar. 9, 2004; the entire contents of which are incorporated herein by reference.

BACKGROUND OF THE INVENTION

1. Field of the Invention

The present invention relates to a mobile communication system in which data is transmitted and received through a wireless transmission line between a network-side device (node) and a mobile station device, and to a mobile station device and a network-side device for use in the mobile communication system.

2. Description of the Related Art

As an error-correcting function in a data link layer, an "Automatic Repeat reQuest (ARQ)" system has been known.

Under the ARQ system, in a data link layer, a data block received from a higher layer is divided into data units of a predetermined size for transmission to a lower layer. Since retransmission processing by the ARQ system is performed on individual data units in the data link layer, a sequence number is given to each data unit to uniquely identify the data unit.

In a data link layer of a receiving-side device, the presence or absence of a reception error in a data unit identified by a sequence number is detected, and the result of the error detection is informed to a transmitting-side device as acknowledgement information or a retransmission request.

The "acknowledgement" is control information which indicates up to what sequence number data unit the receiving-side device has successfully received without interruption, indicating the sequence number of a data unit, among data units not yet received, to receive next.

The "retransmission request" is control information which indicates what sequence number data unit could not be received.

For example, the transmitting-side device adds information called a polling bit to a data unit, thereby indicating a trigger to issue the acknowledgement and the retransmission information to the receiving-side device. Generally, a trigger to issue the acknowledgement and a trigger to issue the retransmission request are the same.

A system in which only a data unit (data units) in which a reception error is detected can be selectively retransmitted using the acknowledgement and the retransmission request as described above is called a "Selective-Repeat ARQ system".

In the Selective-Repeat ARQ system, a transmitting-side device and a receiving-side device are each provided with a buffer in which a certain number of data units can be held, so that the transmitting-side device can successively transmit a maximum number of N data units without receiving the acknowledgement.

FIG. 1 illustrates an example of operations in which data units are transmitted and received in a data link layer using a Selective-Repeat ARQ system of a related art.

In the example of FIG. 1, a network-side device (transmitting-side device) 7 can transmit up to three data units without receiving an acknowledgement from a mobile station device (receiving-side device) 5. A polling bit informed from the network-side device 7 is assumed as a trigger to issue the acknowledgement.

In FIG. 1, "SN" represents a sequence number uniquely identifying a data unit; "ACK" represents an acknowledgement; "NACK" represents a retransmission request; and "P" represents a polling bit.

In the example of FIG. 1, a polling bit P is added when the last data unit in a transmission buffer is sent to a lower layer, or added to a data unit including the end of a data block in a higher layer, or added to the last data unit in a retransmission buffer when retransmission processing is performed. Here, one data block is made up of three data units.

In the data link layer, three buffers are provided: the transmission buffer, the acknowledgement waiting buffer, and the retransmission buffer.

Here, the transmission buffer divides a data block in a higher layer into data units, and holds them until actually sending them to a lower layer.

The acknowledgement waiting buffer holds data units sent to the lower layer until receiving an acknowledgement, and has a specified size capable of holding N data units. The N is called a window size.

The retransmission buffer holds, upon receipt of a retransmission request, a data unit until sending it to the lower layer.

The example of FIG. 1 shows the process in which a reception error occurs in a data unit of SN=4, and the data unit of SN=4 is retransmitted.

FIG. 2 illustrates multiple retransmissions which can occur in a radio access network having a long transmission delay when the related-art retransmission processing in a data link layer is adopted.

In the example of FIG. 2, a reception error occurs in a data unit of SN=1, and the network-side device 7 performs retransmission processing on the data unit of SN=1 in response to a first piece of retransmission request, and then performs retransmission processing on the data unit of SN=1 for a second time in response to a second piece of retransmission request (which reached to the transmitting-side device) before the result of reception of the retransmitted data unit is reflected in the mobile station device 5 (the receiving-side device).

In the example of FIG. 2, a polling bit P is added when the last data unit in the transmission buffer is sent to the lower layer, or added to a data unit including the end of a data block in the higher layer, or added to the last data unit in the retransmission buffer when retransmission processing is performed. Here, one data block is made up of three data units.

As shown in FIG. 3, a general mobile communication system includes mobile station devices 5, radio base station devices 6, a network-side device 7, wireless transmission lines 2 connecting the mobile station devices 5 and the radio base station devices 6, and wired transmission lines 4 connecting the radio base station devices 6 and the network-side device 7.

Each radio base station devices 6 accommodates a plurality of mobile station devices 5 in a service area 3 through wireless transmission lines 2.

The network-side device 7 accommodates a plurality of radio base station devices 6 through the wired transmission lines 4, and is intensively provided with functions required to accommodate the mobile station devices 5.

Here, transmission line characteristics of the wireless transmission lines 2 depend on buildings or the like, varying from time to time with the movements of the mobile station devices 5. Thus the wireless transmission lines 2 have transmission error rates higher than those of the wired transmission lines 4.

Therefore, it is difficult for the wireless transmission lines 2 to ensure communication quality compared to the wired transmission lines 4, and retransmission processing using an ARQ system is required in the above-described mobile communication system.

Also, in this mobile communication system, a transmission delay is long, because a transmission line between the network-side device 7 and each mobile station device 5 (a radio access network 1 includes a wireless transmission line 2 and a wired transmission line 4) passes through the radio base station device 6 which performs modulation and demodulation in the wireless transmission line 2.

In efforts to increase a transmission rate of data units in the radio access network 1 characterized by such high transmission error rates and long time delays, the following two problems will arise:

The first problem is that in a transmitting-side device, as a result of increasing the transmission rate of data units, successively transmitted data units can reach the upper limit N of the acknowledgement waiting buffer (window size) before an acknowledgement transmitted from a receiving-side device reaches the transmitting-side device.

The second problem is that multiple retransmissions can occur, because intervals at which to issue the control information (a retransmission request) at a receiving-side device are shorter than a period of time between the time at which the retransmission request is issued at the receiving-side device and the time at which the retransmitted data unit reaches the receiving-side device.

Here, the "multiple retransmissions" indicate a phenomenon in which retransmission processing is performed several times on a data unit at the transmitting-side device before an acknowledgement issued at the receiving-side device on the data unit retransmitted from the transmitting-side device reaches the transmitting-side device.

The above two problems have characteristics that the longer the transmission delay between the mobile station device 5 and the network-side device 7 is, the lower the effective transmission rate of data units is.

To lessen the first problem, it is necessary to increase the issue rate of the control information (the acknowledgement and the retransmission request).

However, this causes frequent multiple retransmissions which are the second problem, resulting in wasteful consumption of the transmission bandwidth between the mobile station device 5 and the network-side device 7.

Contrarily, when the issue rate of the control information (the acknowledgement and the retransmission request) is reduced to reduce multiple retransmissions, the first problem worsens.

Hereinafter, as an example of a mobile communication system, retransmission processing in an IMT-2000 system will be described.

The IMT-2000 system provides a method of putting a limit on the issue rate of the control information so as to efficiently use the transmission bandwidth of wireless transmission lines, in addition to the above-described general retransmission processing in a data link layer.

The method of limiting the issue rate of the control information is implemented by setting a control information issue prohibition period which is fixed.

At the point of time when a trigger to issue the control information is obtained, the following processing is performed. That is, if the control information issue prohibition period has not elapsed since the last issue of control information, the issue of new control information is suspended.

At the point of time when the control information prohibition period has elapsed since the last issue of control information, new control information is issued.

The IMT-2000 system also proposes a means for adjusting the issue of a retransmission request to delay in a transmission line, which is called the "Estimated PDU Counter (EPC)".

When the retransmission request is issued at a receiving-side device, the EPC calculates, as a "control information issue prohibition period which is adapted to the current bit rate", a reasonable period between the execution of retransmission processing on a data unit at a transmitting-side device in response to the retransmission request and the completion of reception of the retransmitted data unit at the receiving-side device.

During the control information issue prohibition period, the receiving-side device terminates the issue of new control information even when a trigger to issue next control information occurs.

That is, when getting a trigger to issue the control information during the control information issue prohibition period in the EPC, the receiving-side device generates and issues the control information after a lapse of the control information issue prohibition period.

The use of the EPC can also prevent occurrence of the multiple retransmissions as described above. However, with the EPC, when once a retransmission request is issued, even issue of different retransmission requests on different data units and an acknowledgement is also prohibited. Thus, the above-described first problem still cannot be solved.

As described above, the Selective-Repeat ARQ system used in a data link layer implements an error-correcting function using two pieces of control information, an acknowledgement and a retransmission request.

However, in order to increase a transmission rate of data units in the radio access network 1 characterized by a long transmission delay, it is required for a receiving-side device to issue an acknowledgement with high frequency due to the limitation of the size (window size) of acknowledgement waiting buffers provided in the mobile station devices 5 and the network-side device 7.

Generally, the acknowledgement and the retransmission request are handled as the same kind of control information, and are communicated to a transmitting-side device based on the same trigger for issue.

Therefore, the issue of an acknowledgement with high frequency also triggers simultaneous issue of a retransmission request with the same frequency.

As a result, in the radio access network 1 characterized by a high transmission error rate and a long transmission delay, a retransmission request including the same contents is issued to a transmitting-side device, causing the problem of multiple retransmissions.

BRIEF SUMMARY OF THE INVENTION

The present invention has been made in view of the above problems, and has an object of providing a mobile communication system, a mobile station device and a network-side device capable of preventing the multiple retransmissions while preventing decrease in a transmission rate of data units.

A first aspect of the present invention is summarized as a mobile communication system in which data is transmitted and received through a wireless transmission line between a mobile station device and a network-side device. A receiving-side device includes a retransmission request transmitter configured to transmit, to a transmitting-side device, a retransmission request for requesting retransmission processing on each data unit of the data, when a reception error is detected in the data unit. The transmitting-side device includes a retransmission time storage configured to store a retransmission time at which the retransmission processing is performed on the data unit; and a retransmission controller configured to control so as not to perform the retransmission processing on the data unit related to a received retransmission request, when the retransmission time of the data unit is stored and a difference between the retransmission time and a current time is shorter than a retransmission prohibition period.

A second aspect of the present invention is summarized as a mobile communication system in which data is transmitted and received through a wireless transmission line between a mobile station device and a network-side device. A transmitting-side device includes a transmitter configured to transmit each data unit of the data to a receiving-side device; and a retransmission controller configured to perform retransmission processing on the data unit, in accordance with a retransmission request from the receiving-side device. The receiving-side device includes an acknowledgement issue prohibition period manager configured to manage an acknowledgement issue prohibition period during which issue of an acknowledgement on a received data unit is prohibited; a retransmission request issue prohibition period manager configured to manage a retransmission request issue prohibition period during which, when a reception error is detected in the data unit, issue of a retransmission request for requesting retransmission processing on the data unit is prohibited; a control information transmitter configured to transmit the acknowledgement on the data unit received within the acknowledgment information issue prohibition period, after a lapse of the acknowledgment information issue prohibition period, and to transmit the retransmission request on the data unit in which a reception error is detected within the retransmission request issue prohibition period, after a lapse of the retransmission request issue prohibition period.

A third aspect of the present invention is summarized as a mobile station device configured to transmit and receive data with a network-side device through a wireless transmission line. The mobile station device includes a retransmission time storage configured to store a retransmission time at which retransmission processing is performed on each data unit of the data; a retransmission request receiver configured to receive, from the network-side device, a retransmission request for requesting the retransmission processing on the data unit, when a reception error is detected in the data unit; and a retransmission controller configured to control so as not to perform the retransmission processing on the data unit related to a received retransmission request, when a retransmission time of the data unit is stored and a difference between the retransmission time and a current time is shorter than a retransmission prohibition period.

A fourth aspect of the present invention is summarized as a mobile station device configured to transmit and receive data with a network-side device through a wireless transmission line. The mobile station device includes an acknowledgement issue prohibition period manager configured to manage an acknowledgement issue prohibition period during which issue of an acknowledgement on each data unit of the data transmitted from the network-side device is prohibited a retransmission request issue prohibition period manager configured to manage a retransmission request issue prohibition period during which, when a reception error is detected in the data unit, issue of a retransmission request for requesting the retransmission processing on the data unit is prohibited; and a control information transmitter configured to transmit the acknowledgement on the data unit received within the acknowledgement issue prohibition period, after a lapse of the acknowledgement issue prohibition period, and to transmit the retransmission request on the data unit in which a reception error is detected within the retransmission request issue prohibition period, after a lapse of the retransmission request issue prohibition period.

A fifth aspect of the present invention is summarized as a network-side device configured to transmit and receive data with a mobile station device through a wireless transmission line. The network-side device includes a retransmission time storage configured to store a retransmission time at which retransmission processing is performed on each data unit of the data; a retransmission request receiver configured to receive, from the mobile station device, a retransmission request for requesting the retransmission processing on the data unit when a reception error is detected in the data unit; and a retransmission controller configured to control so as not to perform the retransmission processing ion the data unit related to a received retransmission request when a retransmission time of the data unit is stored and a difference between the retransmission time and a current time is shorter than a retransmission prohibition period.

A sixth aspect of the present invention is summarized as a network-side device configured to transmit and receive data with a mobile station device through a wireless transmission line. The network-side device includes an acknowledgement issue prohibition period manager configured to manage an acknowledgement issue prohibition period during which issue of an acknowledgement on each data unit of the data transmitted from the mobile station device is prohibited; a retransmission request issue prohibition period manager configured to manage a retransmission request issue prohibition period during which, when a reception error is detected in the data unit, issue of a retransmission request for requesting retransmission processing on the data unit is prohibited; and a control information transmitter configured to transmit the acknowledgement on the data unit received within the acknowledgement issue prohibition period after a lapse of the acknowledgement issue prohibition period, and to transmit the retransmission request on the data unit in which a reception error is detected within the retransmission request issue prohibition period, after a lapse of the retransmission request issue prohibition period.

BRIEF DESCRIPTION OF THE SEVERAL VIEWS OF THE DRAWINGS

FIG. 12 is a flowchart illustrating a process of transmitting control information at the receiving-side device in the mobile communication system according to the second embodiment of the present invention;

FIG. 13 is a flowchart illustrating a process of transmitting control information at the receiving-side device in the mobile communication system according to the second embodiment of the present invention; and FIG. 14 is a flowchart illustrating a process of transmitting control information at the receiving-side device in the mobile communication system according to the second embodiment of the present invention.

DETAILED DESCRIPTION OF THE INVENTION

First Embodiment of the Invention

Figure 1:
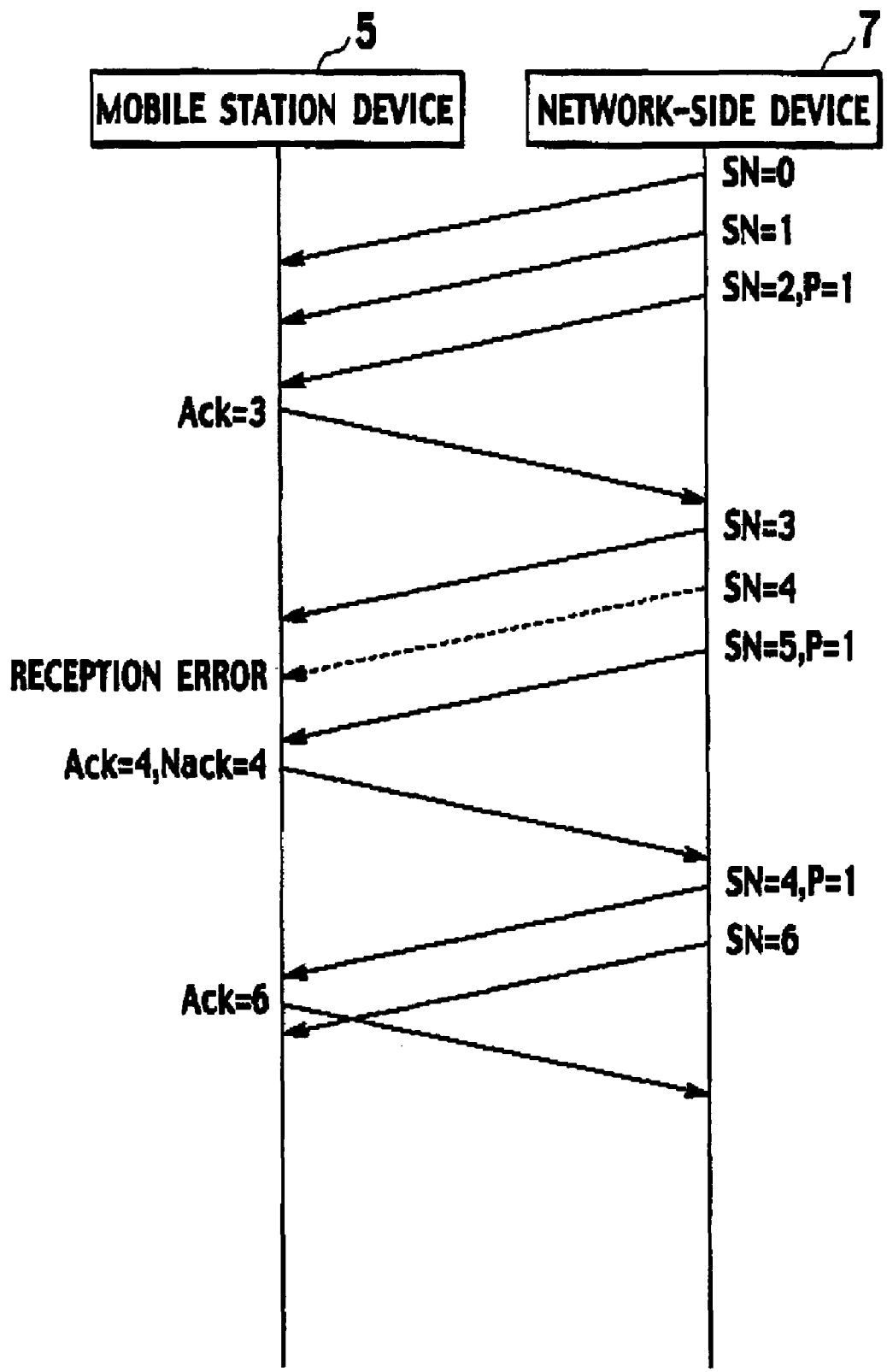
FIG. 1 is a sequence diagram illustrating operations in which data is transmitted and received in a mobile communication system in a related art.
Figure 2:
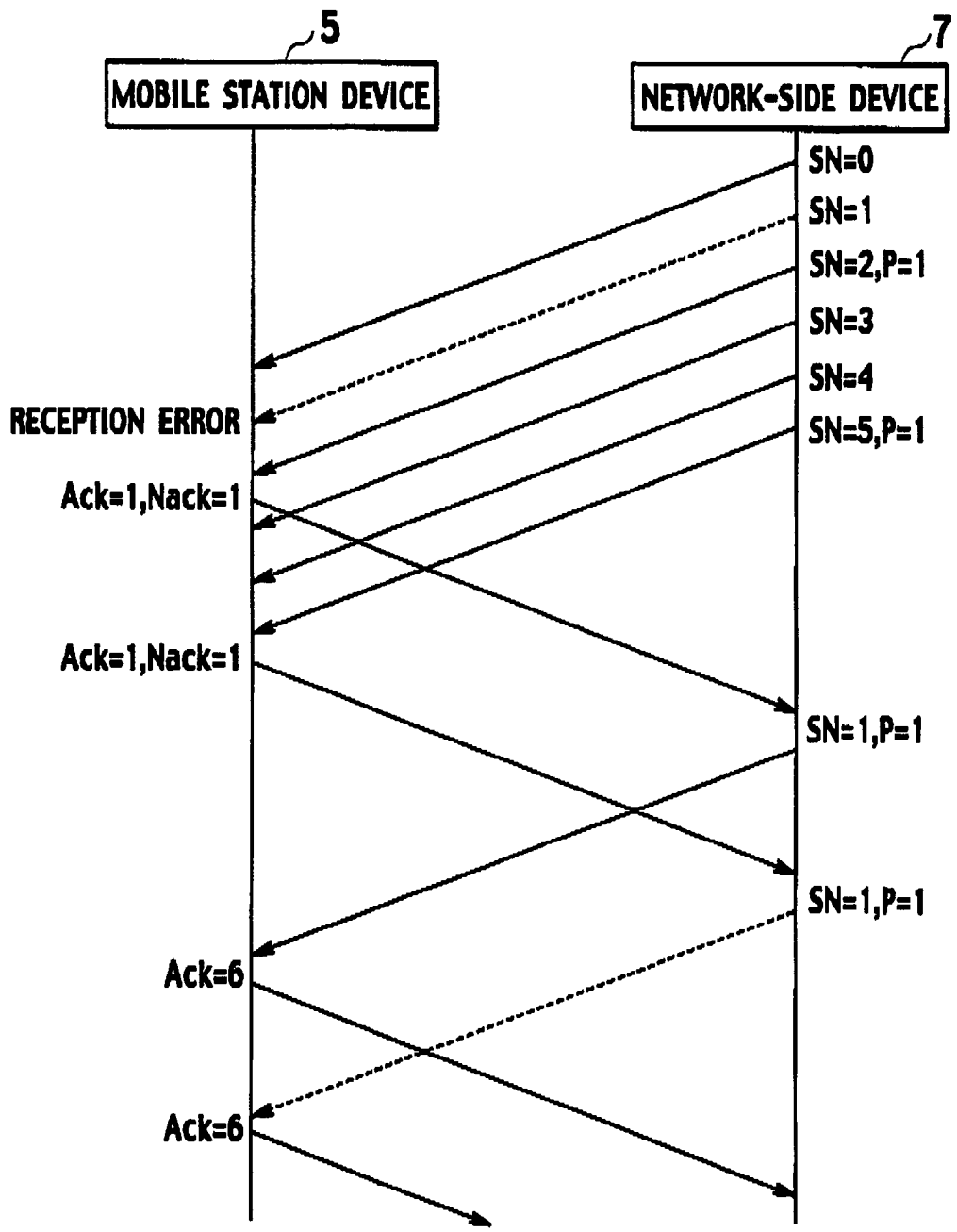
FIG. 2 is a sequence diagram illustrating operations in which data is transmitted and received in a mobile communication system in a related art.
Figure 3:
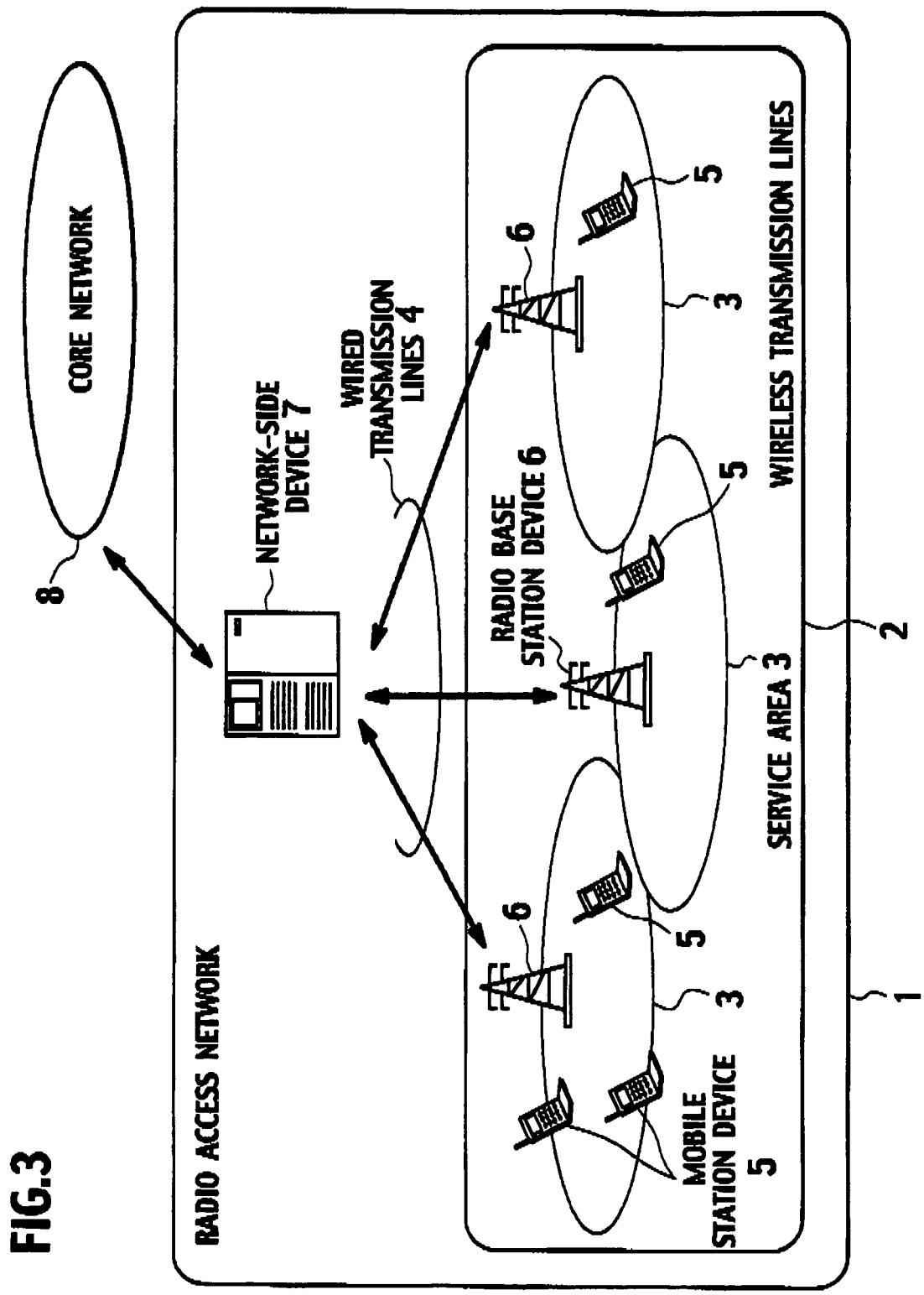
FIG. 3 is a diagram illustrating the entire configuration of a communication system according to first and second embodiments of the present invention.

With reference to FIGS. 3 to 9, a first embodiment of the present invention will now be described, The entire configuration of a mobile communication system according to this embodiment is basically the same as that of a conventional mobile communication system as shown in FIG. 3.

The mobile communication system of this embodiment is configured such that mobile station devices 5 transmit data to a network-side device 7 through a radio access network 1, and the network-side device 7 transmits data to the mobile station devices 5 through the radio access network 1. The mobile station device 5 and the network-side device 7 terminate a data link layer protocol.

This embodiment is based on the premise that functions according to the present invention, that is, data link layer protocol functions are provided in the network-side device (radio control device) 7. However, those functions may alternatively be provided in radio base station devices 6.

In this embodiment, the functions according to the present invention, that is, the data link layer protocol functions are also provided in the mobile station devices 5 as well as in the network-side device 7.

Figure 4:
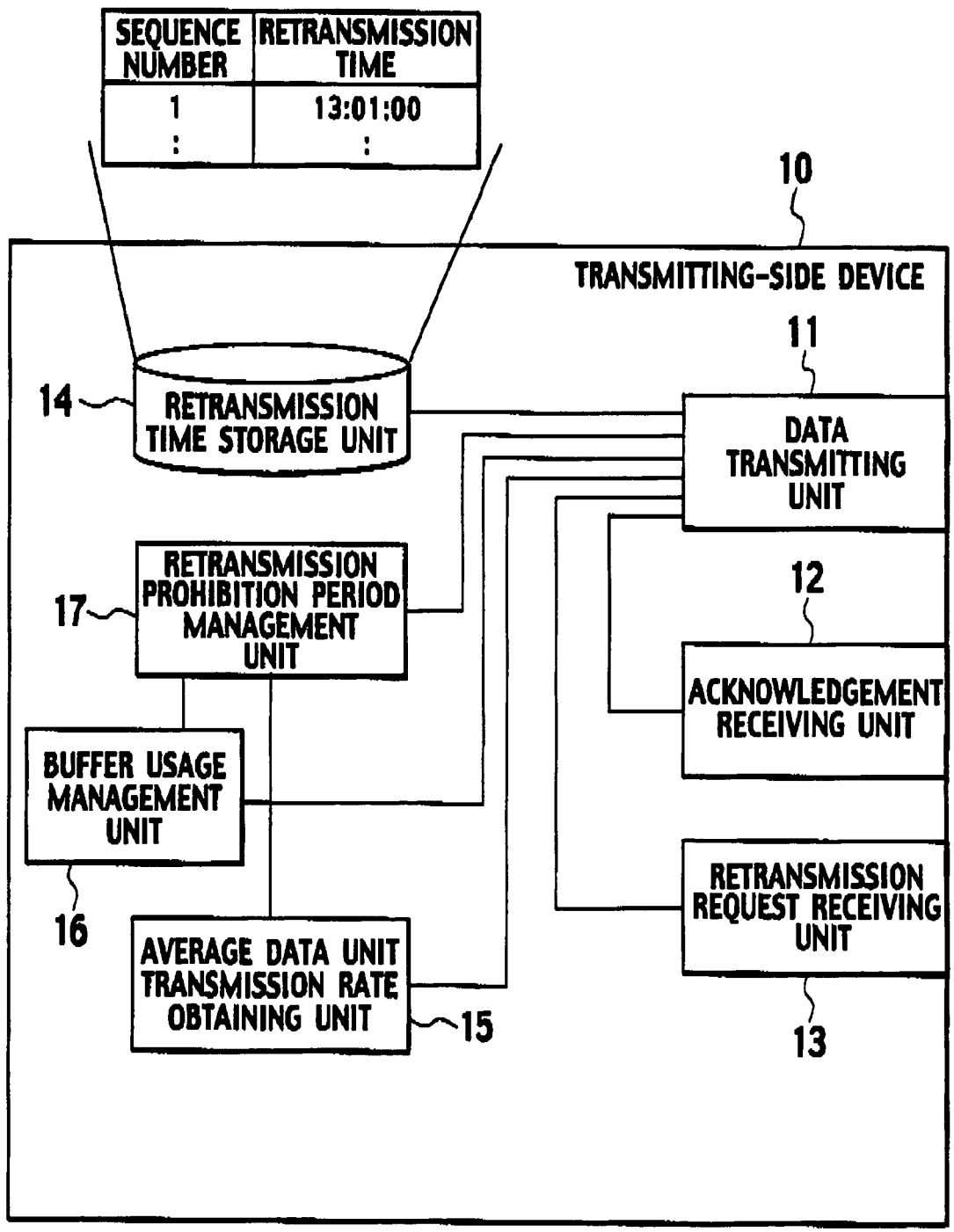
FIG. 4 is a functional block diagram of a transmitting-side device in the mobile communication system according to the first embodiment of the present invention.

Referring to FIG. 4, functions provided to a transmitting-side device (the mobile station device 5 or the network-side device 7) 10 configured to transmit data through the radio access network 1 will be described.

As shown in FIG. 4, the transmitting-side device 10 is provided with a data transmitting unit 11, an acknowledgement receiving unit 12, a retransmission request receiving unit 13, a retransmission time storage unit 14, an average data unit transmission rate obtaining unit 15, a buffer usage management unit 16, and a retransmission prohibition period management unit 17.

The data transmitting unit 11 is configured to divide data to be transmitted into data units for transmission to a receiving-side device 30 through the radio access network 1 using data link protocol functions.

The data transmitting unit 11 is also configured to perform retransmission processing on a corresponding data unit based on a retransmission request from the receiving-side device 30.

More specifically, the data transmitting unit 11 is configured to control so as not to perform the retransmission processing on a data unit related to the retransmission request received from the receiving-side device 30, when a retransmission time of the data unit is stored in the retransmission time storage unit 14 and the difference between the retransmission time and a current time is shorter than a retransmission prohibition period.

When retransmitting a corresponding data unit in response to the received retransmission request, the data transmitting unit 11 is configured to store the sequence number and the retransmission time of the data unit in the retransmission time storage unit 14.

Thereafter, when performing the second and subsequent retransmission processing on the data unit, the data transmitting unit 11 is configured to calculate the difference between the retransmission time stored in the retransmission time storage unit 14 and a current time.

Only when the difference is equal to or greater than a predetermined threshold (the retransmission prohibition period), the data transmitting unit 11 is configured to permit the retransmission processing to be performed on the data unit, thus serving to prevent the multiple retransmissions.

Here, the data transmitting unit 11 is configured to determine whether or not "t-t_old<T_threshold", where "t" represents the current time, "t_old" represents the retransmission time stored in the retransmission time storage unit 14, and "T_threshold" represents the retransmission prohibition period.

When the result of the determination is "true", the data transmitting unit 11 is configured not to perform the retransmission processing on the data unit. Conversely, when the result of determination is "false", the data transmitting unit 11 is configured to perform the retransmission processing on the data unit.

When performing the retransmission processing, the data transmitting unit 11 is configured to substitute the value of the current time "t" for "t_old", thereby updating the retransmission time.

Here, when the transmitting-side device 10 operates in "Mode-1", the time of receipt of a retransmission request is recorded as the current time "t".

When the transmitting-side device 10 operates in "Mode-2", a time immediately before a data unit is sent to a lower layer is recorded as the current time "t".

The acknowledgement receiving unit 12 is configured to receive an acknowledgement transmitted from the receiving-side device 30.

Here, the acknowledgement is control information indicating up to what sequence number data unit the receiving-side device 30 has successfully received without interruption.

The retransmission request receiving unit 13 is configured to receive a retransmission request transmitted from the receiving-side device 30.

Here, the retransmission request is control information indicating what sequence number data unit could not be received when the receiving-side device 30 detects a reception error in the data unit, thereby requesting retransmission processing on the data unit.

The retransmission time storage unit 14 is configured to store a retransmission time at which retransmission processing is performed on a data unit.

Specifically, the retransmission time storage unit 14 is configured to stores a record in which the sequence number of a data unit is associated with the retransmission time.

The average data unit transmission rate obtaining unit 15 is configured to obtain an average data unit transmission rate R(n) which is an average of transmission rates of data units transmitted from the transmitting-side device 10.

For example, the average data unit transmission rate obtaining unit 15 is configured to calculate the average data unit transmission rate R(n) by the following expression;

$$\begin{cases} R(n) = \{Ns(n) - Ns(n-1)\}/ & (Ns(n) \geq Ns(n-1)) \\ \{t(n) - t(n-1)\} \\ R(n) = \{Ns(n) + Ns\_max + 1 - & (Na(n) < Ns(n-1)) \\ Ns(n-1)\}/\{t(n) - t(n-1)\} \end{cases}$$ (expression 1)

or $$R(n) = \{(Ns(n) + Ns\_max + 1 - Ns(n-1)) \bmod (Ns\_max + 1)\}/ \\ [t(n) - t(n-1)]$$ (expression 2)

Here, Ns(n) represents the sequence number of a data unit to be transmitted next among data units not yet transmitted recorded at the time of receipt of the nth acknowledgement. N_max represents a maximum sequence number of data units. t(n) represents a time recorded at the receipt of the nth acknowledgement.

Specifically, every time the transmitting-side device 10 receives the acknowledgement, the average data unit transmission rate obtaining unit 15 is configured to increment the value of "n" in Ns(n) and t(n) by 1.

The initial value Ns(0) of Ns(n) is "0". For the initial value t(0) of t(n), a time at which a data unit is sent for the first time after a connection in the data link layer is set up is substituted.

The buffer usage management unit 16 is configured to manage acknowledgement waiting buffer (window size) usage V(n) in the transmitting-side device 10.

For example, the buffer usage management unit 16 is configured to calculate the acknowledgement waiting buffer usage V(n) in the transmitting-side device 10 by the following expression:

$$\begin{cases} V(n) = Ns(n) - Na(n) & (Ns(n) \geq Na(n)) \\ V(n) = Ns(n) + Ns\_max + 1 - Na(n) & (Ns(n) < Na(n)) \end{cases}$$ (expression 3)

or $$V(n) = \{Ns(n) + Ns\_max + 1 - Na(n)\} \bmod (Ns\_max + 1)$$ (expression 4)

Here, Na(n) represents the sequence number of a data unit written in the nth acknowledgement received at the transmitting-side device 10. The initial value Na(0) of Na(n) is "0".

The retransmission prohibition period management unit 17 is configured to manage the above-described retransmission prohibition period, and to provide the retransmission prohibition period in response to a request from the data transmitting unit 11.

The retransmission prohibition period management unit 17 is configured to update the retransmission prohibition period, every time the transmitting-side device 10 receives the acknowledgement.

For example, the retransmission prohibition period management unit 17 is configured to add the difference between target acknowledgement waiting buffer usage V_target and current acknowledgement waiting buffer usage (acknowledgement waiting buffer usage at the receipt of an acknowledgement) V(n) divided by transmission bandwidth B, to a current retransmission prohibition period T_threshold(n−1), thereby updating the retransmission prohibition period.

In this embodiment, the transmission bandwidth B is managed by the data transmitting unit 11, and indicates the maximum number of transmittable data units per unit time at the transmitting-side device 10.

In this embodiment, the unit of the target acknowledgement waiting buffer usage V_target and the current acknowledgement waiting buffer usage V(n) is the number of data units.

With this, the retransmission prohibition period management unit 17 is configured to update the retransmission prohibition period by "T_threshold(n)=T_threshold(n−1)+{V_target−V(n)}/B" (Expression 5).

Also the retransmission prohibition period management unit 17 is configured to update the retransmission prohibition period by adding the difference between the target acknowledgement waiting buffer usage V_target and the current acknowledgement waiting buffer usage V(n) divided by the average data unit transmission rate R(n), to the current retransmission prohibition period T_threshold(n−1).

With this, the retransmission prohibition period management unit 17 is configured to update the retransmission prohibition period by the expression "T_thershold(n)=T_threshold(n−1)+{V_target−V(n)}/R(n)" (expression 6).

When the retransmission prohibition period T_threshold is adaptively adjusted based on the acknowledgement waiting buffer usage and the average data unit transmission rate detected at the transmitting-side device 10 as described above, multiple retransmissions can be prevented with the acknowledgement waiting buffer usage, or the window size, properly maintained.

Next, with reference to FIGS. 5 to 9, the operation of the mobile communication system according to this embodiment will be described.

Figure 5:
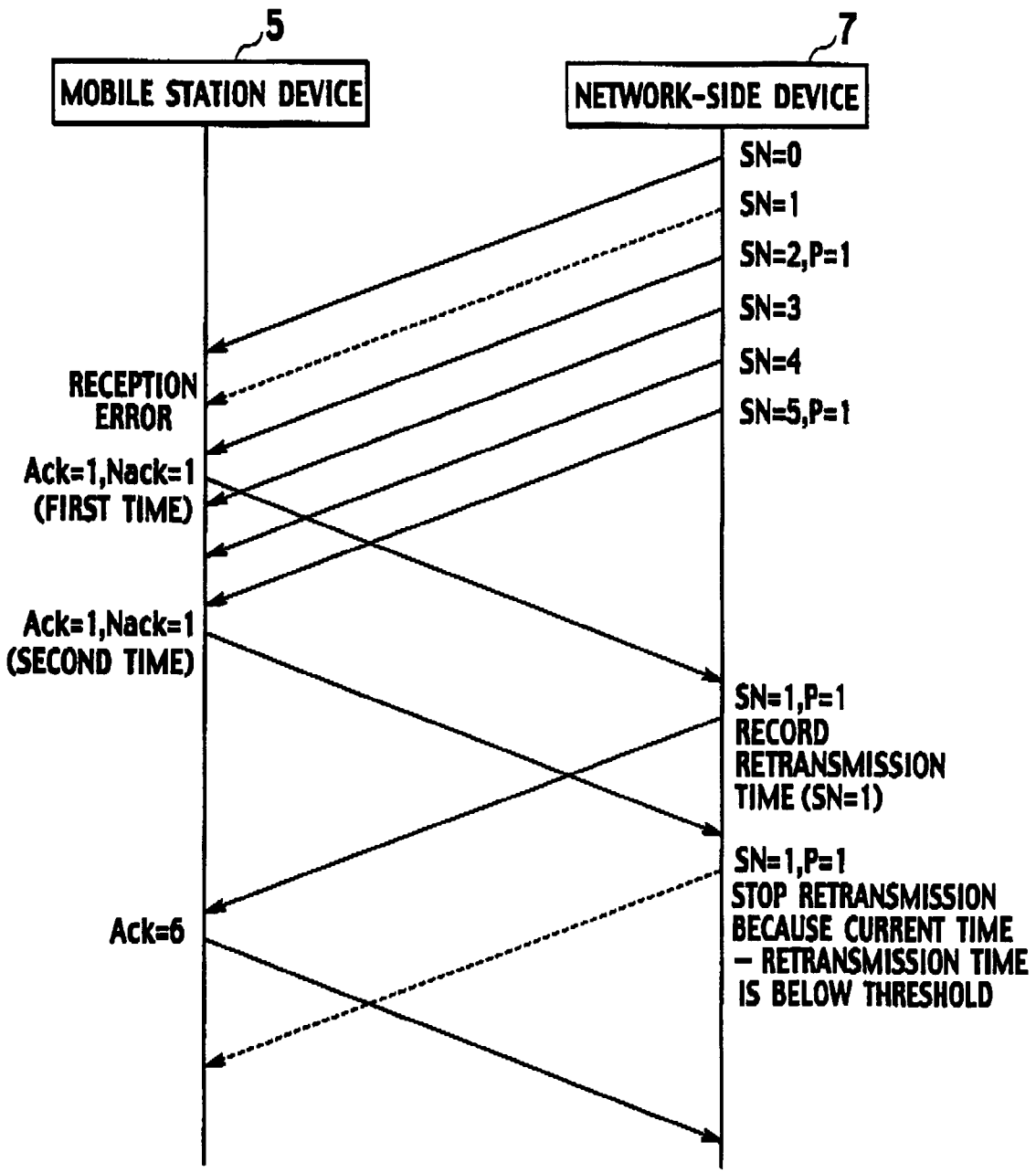
FIG. 5 is a sequence diagram illustrating operations in which data is transmitted and received in the mobile communication system according to the first embodiment of the present invention.

FIG. 5 is a sequence diagram illustrating operations in which data is transmitted and received in the mobile communication system in this embodiment. In the example of FIG. 5, the network-side device 7 corresponds to the transmitting-side device 10, and the mobile station device 5 corresponds to the receiving-side device.

Referring to FIG. 5, the network-side device 7 can successively transmit six data units (SN=0 through SN=5) without receiving an acknowledgement.

A polling bit P is added when the last data unit in the transmission buffer is sent to a lower layer, or added to a data unit including the end of a data block in a higher layer, or added to the last data unit in the retransmission buffer when retransmission processing is performed. Here, one data block is made up of three data units.

In the example of FIG. 5, a reception error occurs in the data unit of SN=1, and the mobile station device 5 issues retransmission requests (NACK=1) twice.

The network-side device 7 performs retransmission processing on the data unit of SN=1 in response to the first retransmission request.

However, the network-side device 7 does not perform the retransmission processing on the data unit of SN=1 in response to the second retransmission request, preventing the multiple retransmissions.

Figure 6:
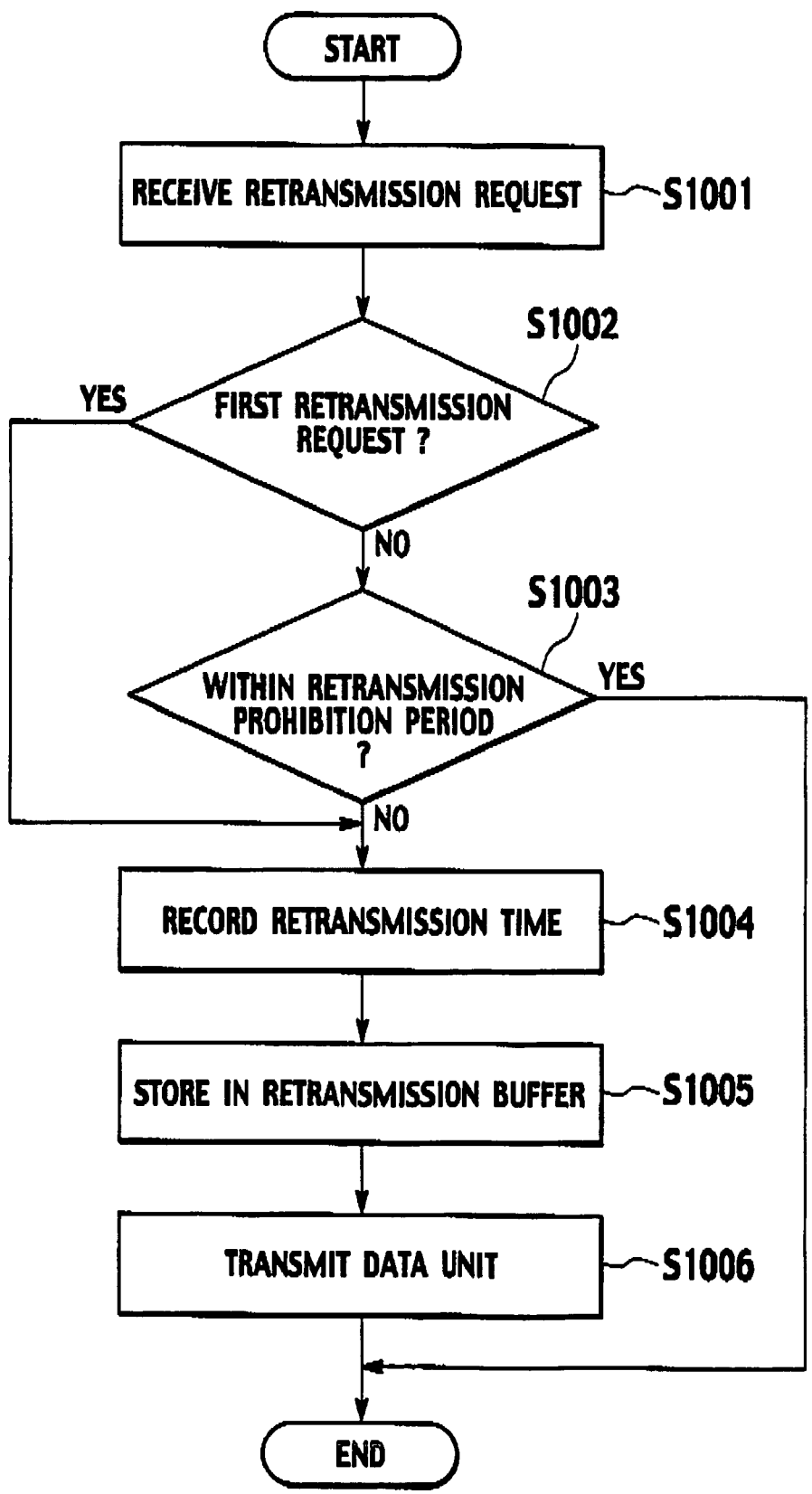
FIG. 6 is a flowchart illustrating a retransmission control process at the transmitting-side device in the mobile communication system according to the first embodiment of the present invention.
Figure 7:
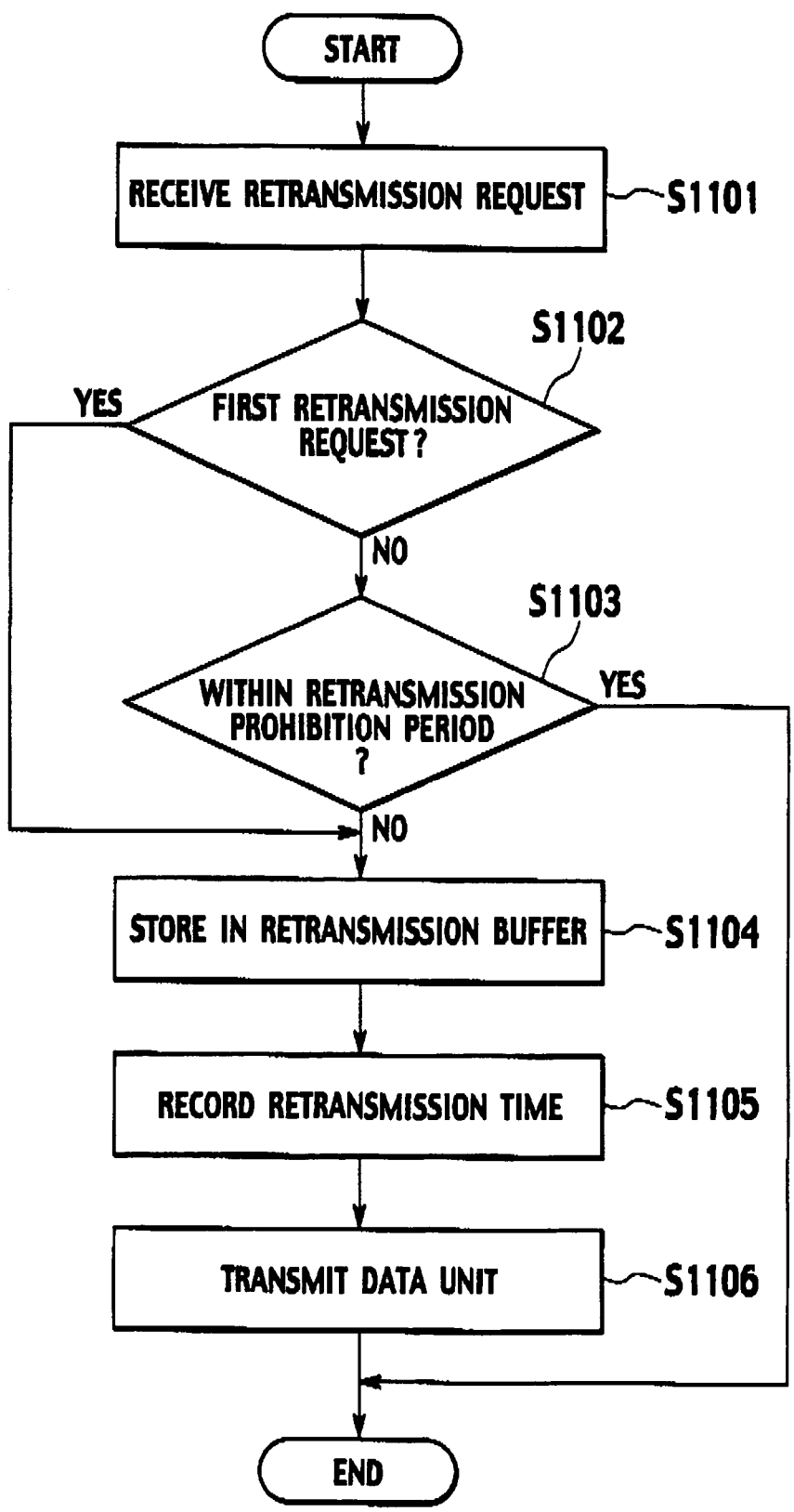
FIG. 7 is a flowchart illustrating a retransmission control process at the transmitting-side device in the mobile communication system according to the first embodiment of the present invention.

This retransmission processing control process will now be described in detail with reference to FIGS. 6 and 7. FIG. 6 is a flowchart illustrating a control process when the network-side device 7 operates in "Mode-1". FIG. 7 is a flowchart illustrating a control process when the network-side device 7 operates in "Mode-2".

First, with reference to FIG. 6, the control process with the network-side device 7 operating in "Mode-1" will be described.

As shown in FIG. 6, in step 1001, the retransmission request receiving unit 13 of the network-side device 7 receives a retransmission request (NACK=1) from the mobile station device 5.

In step 1002, the data transmitting unit 11 of the network-side device 7 refers to the retransmission time storage unit 14, and determines whether or not the received retransmission request is the first retransmission request on the data unit (SN=1), that is, whether or not a retransmission time of the data unit related to the received retransmission request is stored in the retransmission time storage unit 14.

Here, when it is found to be the first retransmission request, the control process proceeds to step 1004. When it is found not to be the first retransmission request, the control process proceeds to step 1003.

In step 1003, the data transmitting unit 11 of the network-side device 7 refers to the retransmission prohibition period management unit 17, and determines whether it is currently within the retransmission prohibition period or not, that is, whether the difference between a current time and the above-described retransmission time is shorter than the retransmission prohibition period T_threshold or not.

When it is found not to be within the retransmission prohibition period, the control process proceeds to step 1004. When it is found to be within the retransmission prohibition period, the control process terminates without performing retransmission processing on the data unit.

In step 1004, the data transmitting unit 11 stores the current time as the retransmission time in the retransmission time storage unit 14, and then in step 1005, stores the data unit in the retransmission buffer, and in step 1006, transmits the data unit to the mobile station device 5 at a predetermined timing.

Second, with reference to FIG. 7, the control process with the network-side device 7 operating in "Mode-2" will be described. Processing in steps 1101 through 1103 is identical to that in the steps 1001 through 1003 shown in FIG. 6.

As shown in FIG. 7, in step 1104, the data transmitting unit 11 stores the data unit in the retransmission buffer, and then in step 1105, stores the current time as the retransmission time in the retransmission time storage unit 14, and in step 1106, transmits the data unit to the mobile station device 5 at a predetermined timing.

Specifically, in the control process with the network-side device 7 operating in "Mode-1", the time of receipt of a retransmission request is recorded as a retransmission time.

In the control process with the network-side device 7 operating in "Mode-2", a time immediately before a data unit is sent to a lower layer is recorded as a retransmission time, excluding the time of retention of the data unit in the retransmission buffer.

Even when the mobile station device 5 and the network-side device 7 are switched in FIG. 5, it is clear that the present invention provides the same effects.

Figure 8:
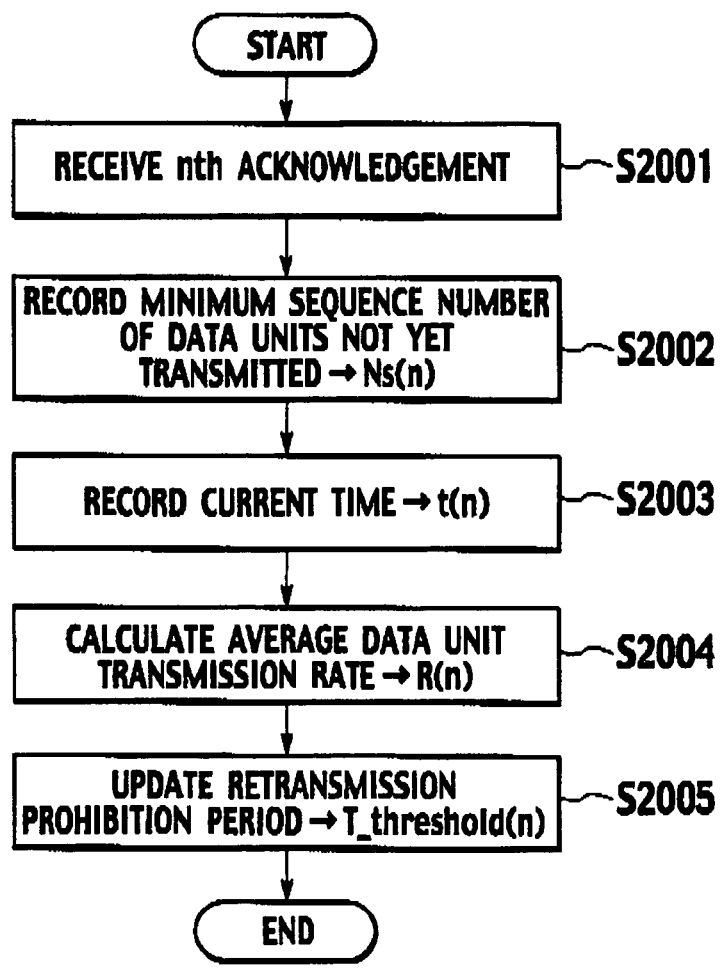
FIG. 8 is a flowchart illustrating a process of updating a retransmission prohibition period at the transmitting-side device in the mobile communication system according to the first embodiment of the present invention.
Figure 9:
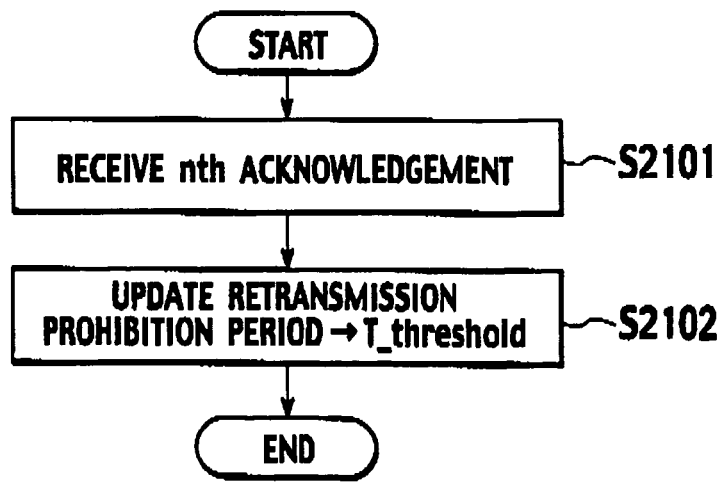
FIG. 9 is a flowchart illustrating a process of updating a retransmission prohibition period at the transmitting-side device in the mobile communication system according to the first embodiment of the present invention.

Referring to FIGS. 8 and 9, two processes of updating the retransmission prohibition period in the network-side device 7 will be described.

In the first process, as shown in FIG. 8, in step 2001, the retransmission prohibition period management unit 17 of the network-side device 7 receives the nth acknowledgement through the acknowledgement receiving unit 12, and in step 2002, records the sequence number of a data unit to be transmitted next, among the sequence numbers of data units not yet transmitted, as Ns (n) and also in step 2003, records a current time as t(n).

In step 2004, the average data unit transmission rate obtaining unit 15 of the network-side device 7 calculates an average data unit transmission rate using the above-described (Expression 1) or (Expression 2), and in step 2005, the retransmission prohibition period management unit 17 of the network-side device 7 updates the retransmission prohibition period using (Expression 5).

In the second process, as shown in FIG. 9, in step 2101, the retransmission prohibition period management unit 17 of the network-side device 7 receives the nth acknowledgement through the acknowledgement receiving unit 12, and in step 2102, obtains current acknowledgement waiting buffer usage managed in the buffer usage management unit 16, and updates the retransmission prohibition period using (Expression 6).

According to the mobile communication system in this embodiment, when control information (a retransmission request) is received, a transmitting-side device selectively terminates retransmission processing which will cause multiple retransmissions during a retransmission prohibition period, thus being able to prevent multiple retransmissions while preventing decrease in a transmission rate of data units.

Second Embodiment of the Invention

With reference to FIGS. 10 to 14, a second embodiment of the present invention will now be described. The entire configuration of a mobile communication system in this embodiment is basically the same as that of a conventional mobile communication system as shown in FIG. 3.

Figure 10:
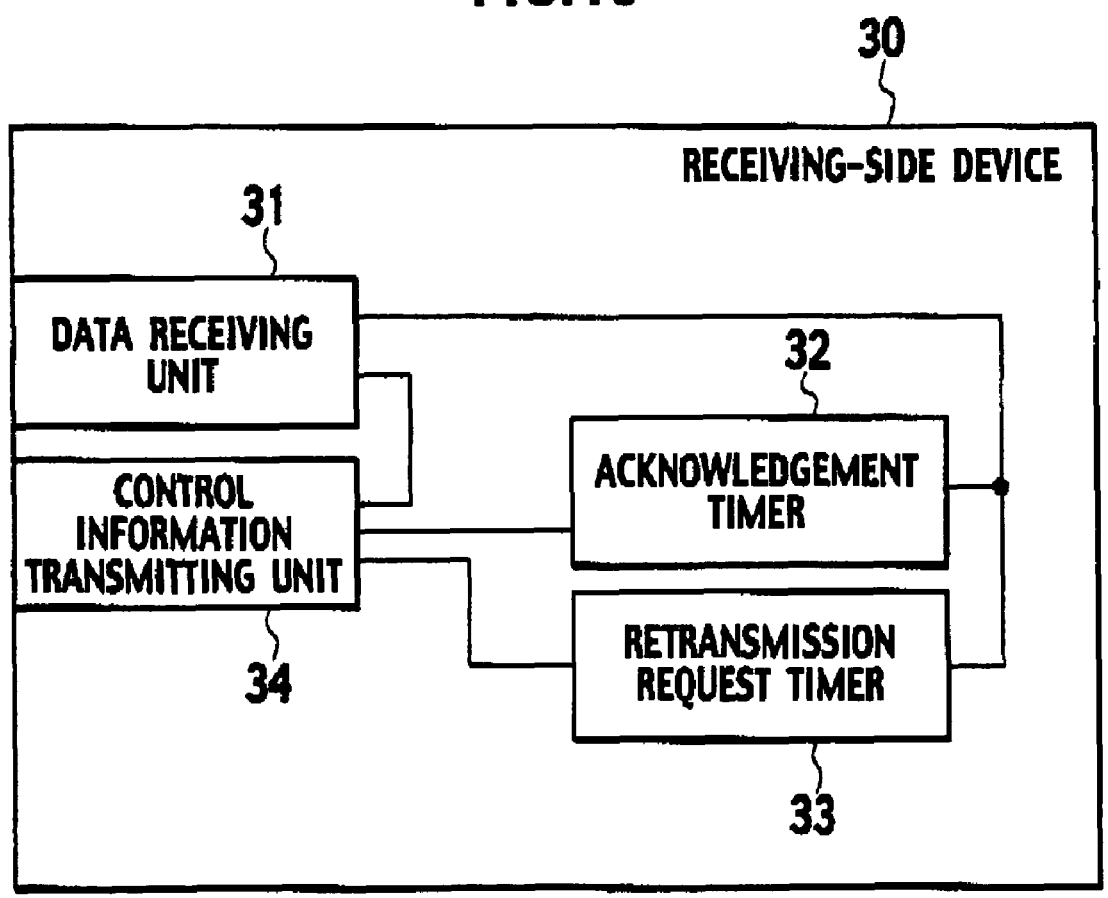
FIG. 10 is a functional block diagram of a receiving-side device in a mobile communication system according to the second embodiment of the present invention.

Referring to FIG. 10, functions provided to a receiving-side device (the mobile station device 5 or the network-side device) 30 configured to receive data through a radio access network 1 will be described.

As shown in FIG. 10, the receiving-side device 30 is provided with a data receiving unit 31, an acknowledgement timer 32, a retransmission request timer 33, and a control information transmitting unit 34.

The data receiving unit 31 is configured to receive data units transmitted from a transmitting-side device 10 using data link layer protocol functions.

The acknowledgement timer 32 is a timer used for managing an acknowledgement issue prohibition period during which the issue of an acknowledgement on a data unit received by the data receiving unit 31 is prohibited.

The retransmission request timer 33 is a timer used for managing a retransmission request issue prohibition period during which, when a reception error is detected in a data unit transmitted from the transmitting-side device 10, the issue of a retransmission request for requesting retransmission processing on the data unit is prohibited. The control information transmitting unit 34 is configured to transmit control information including the acknowledgement and the retransmission request to the transmitting-side device 10.

The control information transmitting unit 34 is also configured to manage the acknowledgement issue prohibition period using the acknowledgement timer 32, and to manage the retransmission request issue prohibition period using the retransmission request timer 33.

That is, the control information transmitting unit 34 is configured to manage the acknowledgement issue prohibition period and the retransmission request issue prohibition period, separately.

The retransmission request issue prohibition period is set according to a delay, and is generally set longer than the acknowledgement issue prohibition period.

More specifically, the control information transmitting unit 34 is configured to transmit the control information including the acknowledgement on a data unit received within the acknowledgement issue prohibition period, after a lapse of the acknowledgement issue prohibition period, and to transmit the control information including the retransmission request on a data unit in which a reception error is detected within the retransmission request issue prohibition period, after a lapse of the retransmission request issue prohibition period.

In other words, even when a trigger to issue the acknowledgement or the retransmission request occurs, the control information transmitting unit 34 is configured not to transmit the acknowledgement or the retransmission request, when a time equal to or longer than the acknowledgement issue prohibition period or the retransmission request issue prohibition period has not elapsed since the last issue of the acknowledgement or the retransmission request.

Alternatively, when a trigger to issue the acknowledgement or the retransmission request occurs, the control information transmitting unit 34 may be configured to generate and hold the acknowledgement or the retransmission request, and to transmit the control information including the acknowledgement or the retransmission request after a lapse of the acknowledgement issue prohibition period or a lapse of the retransmission request issue prohibition period.

However, about the acknowledgement, only the last acknowledgement generated within the acknowledgement issue prohibition period is included in the control information, The control information transmitting unit 34 may alternatively be configured to generate the acknowledgement or the retransmission request after a lapse of the acknowledgement issue prohibition period or a lapse of the retransmission request issue prohibition period.

In this case, it is necessary for the control information transmitting unit 34 to hold the fact that the issue of the acknowledgement or the retransmission request was prohibited.

Next, with reference to FIGS. 11 through 14, the operation of the mobile communication system according to this embodiment will be described.

Figure 11:
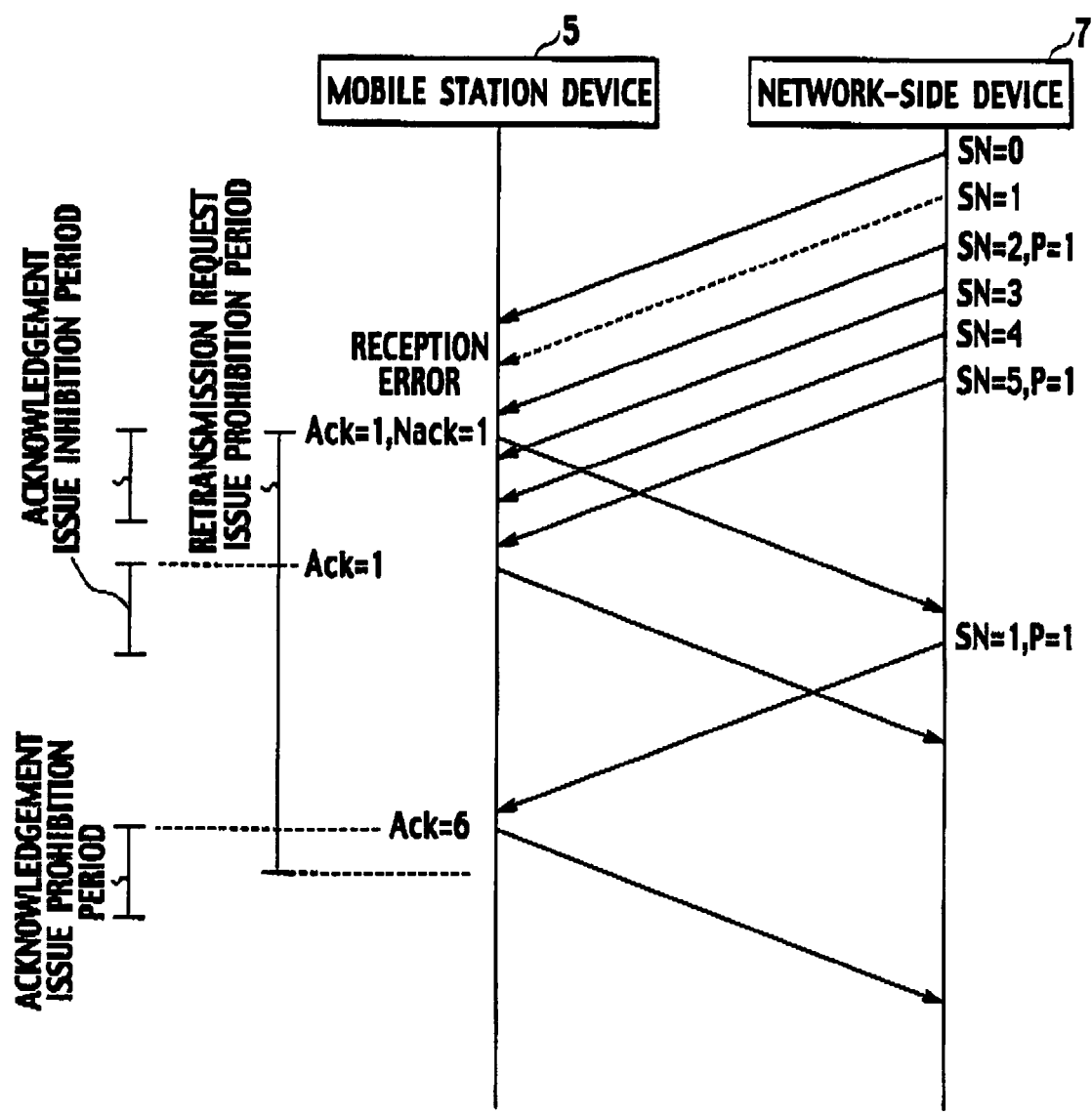
FIG. 11 is a sequence diagram illustrating operations in which data is transmitted and received in the mobile communication system according to the second embodiment of the present invention.

FIG. 11 is a sequence diagram illustrating operations in which data is transmitted and received in the mobile communication system in this embodiment. In the example of FIG. 11, the network-side device 7 corresponds to the transmitting-side device 10, and the mobile station device 5 corresponds to the receiving-side device 30.

In FIG. 11, the network-side device 7 can successively transmit six data units (SN=0 through SN=5) without receiving an acknowledgement.

A polling bit P is added when the last data unit in a transmission buffer is sent to a lower layer, or is added to a data unit including the end of a data block in a higher layer, or is added to the last data unit in a retransmission buffer when retransmission processing is performed. Here, one data block is made up of three data units.

A control process in the retransmission processing will now be described in detail with reference to FIGS. 12 through 14.

First, referring to FIG. 12, a process of transmitting control information at the mobile station device 5 will be described.

As shown in FIG. 12, in step 3001, the data receiving unit 31 of the mobile station device 5 receives a data unit of SN=2 with a polling bit P=1, or detects a reception error in the data unit of SN=1.

In step 3002, the control information transmitting unit 34 of the mobile station device 5 determines whether or not it is currently within the acknowledgement issue prohibition period.

When it is not within the acknowledgement issue prohibition period, the control process proceeds to step 3002a1. When it is within the acknowledgement issue prohibition period, the control process proceeds to step 3002b.

In step 3002a1, the control information transmitting unit 34 of the mobile station device 5 generates an acknowledgement (ACK=1) indicating the sequence number (SN=1) of a data unit to be transmitted next, and puts it in a predetermined field in control information, and in step 3002a2, starts the acknowledgement timer 32.

In step 3002b, the control information transmitting unit 34 of the mobile station device 5 records the fact that the issue of an acknowledgement was prohibited.

Here, the control information transmitting unit 34 of the mobile station device 5 may generate an acknowledgement (ACK=1) indicating the sequence number (SN=1) of a data unit to be transmitted next for transmission after a lapse of the acknowledgement issue prohibition period.

In step 3003, the control information transmitting unit 34 of the mobile station device 5 determines whether or not it is currently outside the retransmission request issue prohibition period and there is a data unit in which a reception error is detected and its retransmission has not been completed yet at the present moment.

When the result of the determination is positive (YES), the control process proceeds to step 3003a1. When the result of the determination is negative (NO), the control process proceeds to step 3003b.

For the occurrence of an reception error in the data unit of the sequence number (SN=1), in step 3003a1, the control information transmitting unit 34 of the mobile station device 5 generates a retransmission request (NACK=1) for requesting retransmission of the data unit, and puts it in a predetermined field in control information, and in step 3003a2, starts the retransmission request timer 33.

In step 3003b, the control information transmitting unit 34 of the mobile station device 5 records the fact that the issue of a retransmission request was prohibited.

Here, the control information transmitting unit 34 of the mobile station device 5 may alternatively generate the above-described retransmission request (NACK=1) for transmission after a lapse of the retransmission request issue prohibition period.

In step 3004, the control information transmitting unit 34 of the mobile station device 5 sends the above control information to a lower layer.

When neither an acknowledgement nor a retransmission request is put in the control information, the control information transmitting unit 34 of the mobile station device 5 does not send the control information to a lower layer.

Next, with reference to FIGS. 13 and 14, operations of the mobile station device 5 after a lapse of the acknowledgement issue prohibition period and after a lapse of the retransmission request issue prohibition period will be described separately.

As shown in FIG. 13, after a lapse of the acknowledgement issue prohibition period in step 3101, in step 3102, the control information transmitting unit 34 of the mobile station device 5 determines whether the fact that the issue of an acknowledgement was prohibited during the acknowledgment information issue prohibition period is stored or not.

When the fact that the issue of an acknowledgement was prohibited is stored, the operation proceeds to step 3104. When the fact that the issue of an acknowledgement was prohibited is not stored, the operation proceeds to step 3103.

In step 3103, since the issue of any acknowledgement has not been prohibited during the acknowledgement issue prohibition period, the control information transmitting unit 34 of the mobile station device 5 determines that there is no acknowledgement to be transmitted, and terminates control information generation processing.

In step 3104, the control information transmitting unit 34 of the mobile station device 5 generates an acknowledgement (ACK=1) indicating the sequence number (SN=1) of a data unit to be transmitted next, and puts it in a predetermined field of control information.

In step 3105, the control information transmitting unit 34 of the mobile station device 5 starts the acknowledgement timer 32, and in step 3106, sends the control information with the acknowledgement to a lower layer.

As shown in FIG. 14, when the retransmission request issue prohibition period elapses in step 3201, in step 3202, the control information transmitting unit 34 of the mobile station device 5 determines whether there is a data unit for which the fact that the issue of a retransmission request was prohibited during the retransmission request issue prohibition period is stored and in which a reception error is detected and whose retransmission has not been completed yet at that moment.

When the result of the determination is positive (YES) the operation proceeds to step 3204. When the result of the determination is negative (NO), the operation proceeds to step 3203.

In step 3203, the control information transmitting unit 34 of the mobile station device 5 determines that there is no retransmission request to be transmitted, and terminates control information generation processing.

In step 3204, the control information transmitting unit 34 of the mobile station device 5 generates a retransmission request (NACK=1) indicating the sequence number (SN=1) of a data unit to be retransmitted, and puts it in a predetermined field of control information.

In step 3205, the control information transmitting unit 34 of the mobile station device 5 starts the retransmission request timer 33, and in step 3206, sends the control information including the retransmission request to a lower layer.

Even when the mobile station device 5 and the network-side device 7 are switched in FIG. 11, it is clear that the present invention provides the same effects.

According to the mobile communication system in this embodiment, a receiving-side device (the mobile station device 5) manages an acknowledgement issue prohibition period and a retransmission request issue prohibition period separately.

Therefore, by setting the retransmission request issue prohibition period longer than the acknowledgement issue prohibition period, multiple retransmissions can be prevented while preventing reduction in transmission rates of data units.

In the example of FIG. 11, since the acknowledgment information (ACK=1) is issued in response to the polling bit P=1 added to SN=5 without issuing a retransmission request (NACK=1), multiple retransmissions of the data unit of SN=1 in which a reception error occurred are prevented.

As described above, the present invention can provide a mobile communication system, a mobile station device and a network-side device capable of implementing efficient retransmission processing while preventing multiple retransmissions even in a radio access network characterized by a high transmission error rate and a long transmission delay. As a result, a phenomenon in which as a transmission delay in a radio access network become longer, the effective transmission rate of data units decrease can be mitigated.

Additional advantages and modifications will readily occur to those skilled in the art. Therefore, the invention in its broader aspects is not limited to the specific details and the representative embodiment shown and described herein. Accordingly, various modifications may be made without departing from the scope of the general inventive concept as defined by the appended claims and their equivalents.

What is claimed is:

1. A mobile communication system in which data is transmitted and received through a wireless transmission line between a mobile station device and a network-side device, the system comprising:

a receiving-side device; and a transmitting-side device, the receiving-side device comprises a retransmission request transmitter configured to transmit, to a transmitting-side device, a retransmission request for requesting retransmission processing on each data unit of the data when a reception error is detected in the data unit, and the transmitting-side device comprises a retransmission time storage configured to store a retransmission time at which the retransmission processing is performed on the data units, a retransmission controller configured to perform the retransmission processing on the data unit related to the retransmission request when the retransmission request is received from the receiving-side device, and the retransmission controller is configured to control so as not to perform the retransmission processing on the data unit related to the retransmission request when the retransmission time of the data unit is stored and a difference between the retransmission time and a current time is shorter than a retransmission prohibition period, even when the retransmission request is received from the receiving-side device, and a retransmission prohibition period manager configured to update the retransmission prohibition period by adding a difference between target acknowledgement waiting buffer usage and current acknowledgement waiting buffer usage divided by transmission bandwidth to a current retransmission prohibition period.

2. A mobile communication system in which data is transmitted and received through a wireless transmission line between a mobile station device and a network-side device, the system comprising:

a receiving-side device; and a transmitting-side device, the receiving-side device comprises a retransmission request transmitter configured to transmit, to the transmitting-side device, a retransmission request for requesting retransmission processing on each data unit of the data when a reception error is detected in the data unit, and the transmitting-side device comprises
- a retransmission time storage configured to store a retransmission time at which the retransmission processing is performed on the data unit,
- a retransmission controller configured to perform the retransmission processing on the data unit related to the retransmission request when the retransmission request is received from the receiving-side device, and the retransmission controller is configured to control so as not to perform the retransmission processing on the data unit related to the retransmission request when the retransmission time of the data unit is stored and a difference between the retransmission time and a current time is shorter than a retransmission prohibition period, even when the retransmission request is received from the receiving-side device, and
- a retransmission prohibition period manager configured to update the retransmission prohibition period by adding a difference between target acknowledgement waiting buffer usage and current acknowledgement waiting buffer usage divided by an average data unit transmission rate to a current retransmission prohibition period.

3. A mobile station device configured to transmit and receive data with a network-side device through a wireless transmission line, the mobile station device comprising:
- a retransmission time storage configured to store a retransmission time at which retransmission processing is performed on each data unit of the data;
- a retransmission request receiver configured to receive, from the network-side device, a retransmission request for requesting the retransmission processing on the data unit, when a reception error is detected in the data unit;
- a retransmission controller configured to perform the retransmission processing on the data unit related to the retransmission request, when the retransmission request is received from the network-side device, and the retransmission controller is configured to control so as not to perform the retransmission processing on the data unit related to the retransmission request when a retransmission time of the data unit is stored and a difference between the retransmission time and a current time is shorter than a retransmission prohibition period, even when the retransmission request is received from the receiving-side device; and
- a retransmission prohibition period manager configured to update the retransmission prohibition period by adding a difference between target acknowledgement waiting buffer usage and currently acknowledgement waiting buffer usage divided by transmission bandwidth to a current retransmission prohibition period.

4. A mobile station device configured to transmit and receive data with a network-side device through a wireless transmission line, the mobile station device comprising:
- a retransmission time storage configured to store a retransmission time at which retransmission processing is performed on each data unit of the data;
- a retransmission request receiver configured to receive, from the network-side device, a retransmission request for requesting the retransmission processing on the data unit, when a reception error is detected in the data unit;
- a retransmission controller configured to perform the retransmission processing on the data unit related to the retransmission request, when the retransmission request is received from the network-side device, and the retransmission controller is configured to control so as not to perform the retransmission processing on the data unit related to the retransmission request when a retransmission time of the data unit is stored and a difference between the retransmission time and a current time is shorter than a retransmission prohibition period, even when the retransmission request is received from the receiving-side device; and
- a retransmission prohibition period manager configured to update the retransmission prohibition period by adding a difference between target acknowledgement waiting buffer usage and currently acknowledgement waiting buffer usage divided by an average data unit transmission rate to a current retransmission prohibition period.

* * * * *